(12) United States Patent
Maeng et al.

(10) Patent No.: US 10,316,852 B2
(45) Date of Patent: Jun. 11, 2019

(54) AIR CONDITIONER FOR VEHICLE

(71) Applicant: HANON SYSTEMS, Daejeon (KR)

(72) Inventors: Chan Joo Maeng, Daejeon (KR); Hong Hee Jeong, Daejeon (KR); Jeong Eun Lee, Daejeon (KR); Youn Woo Lim, Daejeon (KR); Sang Ho Oh, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 258 days.

(21) Appl. No.: 15/150,605

(22) Filed: May 10, 2016

(65) Prior Publication Data

US 2016/0333887 A1 Nov. 17, 2016

(30) Foreign Application Priority Data

May 11, 2015 (KR) .................. 10-2015-0065167
May 11, 2015 (KR) .................. 10-2015-0065170
May 15, 2015 (KR) .................. 10-2015-0067884

(51) Int. Cl.
*F04D 17/16* (2006.01)
*F04D 27/00* (2006.01)
(Continued)

(52) U.S. Cl.
CPC ....... *F04D 27/004* (2013.01); *B60H 1/00471* (2013.01); *B60H 1/00828* (2013.01);
(Continued)

(58) Field of Classification Search
CPC ............ B60H 1/00828; B60H 1/00471; F04D 27/004; F04D 25/068; F04D 13/0686;
(Continued)

(56) References Cited

U.S. PATENT DOCUMENTS 4,802,405 A * 2/1989 Ichitani .............. B60H 1/00007
165/100
5,063,832 A * 11/1991 Mirumachi ........ B60H 1/00471
415/206
(Continued)

FOREIGN PATENT DOCUMENTS

CN 201134727 Y 10/2008
CN 203906334 U 10/2014
WO WO 03037664 A2 * 5/2003 ......... B60H 1/00514

OTHER PUBLICATIONS

Machine Translation of WO 03037664 A2 document authored by Jean Gatinois.*

*Primary Examiner* — Peter J Bertheaud
*Assistant Examiner* — Dnyanesh G Kasture
(74) *Attorney, Agent, or Firm* — Dickinson Wright PLLC

(57) ABSTRACT

An air conditioner for a vehicle includes a blower motor and a blower control unit integrated so that terminals therebetween can be easily connected and a PCB is closely fixed to a flange with stronger power. The air conditioner includes: a blower unit having a blower motor driving a blower wheel to blow wind to the inside of an air-conditioning case; a blower control unit controlling the blower motor to control rotation of the blower wheel; a flange on which the blower motor is fixed and to which a PCB of the blower control unit is joined to one side of the blower motor; a first terminal associated with the blower motor; and a second terminal associated with the PCB and which is combined with the first terminal, wherein the blower control unit and the blower motor are formed integrally to the blower unit.

18 Claims, 17 Drawing Sheets

(51) Int. Cl.
  *B60H 1/00* (2006.01)
  *F04D 25/06* (2006.01)
  *F04D 29/42* (2006.01)

(52) U.S. Cl.
  CPC ........... *F04D 17/16* (2013.01); *F04D 25/068* (2013.01); *F04D 25/0693* (2013.01); *F04D 29/4206* (2013.01)

(58) Field of Classification Search
  CPC .. F04D 29/4206; F04D 25/0693; F04D 17/16; F04D 29/58; F04D 29/5813; H05K 1/0203; H05K 1/0204; H05K 1/0205; H05K 1/0206; H05K 7/20136; H05K 7/20145; H05K 7/20172; H05K 7/2039; H05K 7/205
  See application file for complete search history.

(56) References Cited

U.S. PATENT DOCUMENTS

| | | | | |
|---|---|---|---|---|
| 5,119,466 | A | * | 6/1992 | Suzuki ..................... H02K 9/22 310/68 R |
| 6,488,475 | B2 | * | 12/2002 | Murata ..................... A47L 5/22 417/32 |
| 2014/0318829 | A1 | * | 10/2014 | Dede ................... H05K 1/0203 174/251 |

* cited by examiner

PRIOR ART

PRIOR ART

AIR CONDITIONER FOR VEHICLE

CROSS-RELATED APPLICATIONS

This application claims the benefit and priority of Korean Application No. KR 10-2015-0065167 filed May 11, 2015, Korean Application No. KR 10-2015-0065170 filed May 11, 2015, and Korean Application No. KR 10-2015-0067884 filed May 15, 2015. The entire disclosure of each of the above applications is incorporated herein by reference.

BACKGROUND OF THE INVENTION

Field of the Invention

The present invention relates to an air conditioner for a vehicle and a method for manufacturing a blower unit of the same, and more particularly, to an air conditioner for a vehicle, which includes a blower unit for blowing indoor air or outdoor air to the inside of the air conditioner, and a method for manufacturing a blower unit of the same.

Background Art

An air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes: a blower unit for sending indoor air or outdoor air to the inside of an air-conditioning case; an evaporator disposed inside the air-conditioning case in order to cool the inside of the air-conditioning case; and a heater core for heating the inside of the air-conditioning case, and selectively send the air cooled by the evaporator or heated by the heater core toward components of the interior of the vehicle.

FIG. 1 is a sectional view showing the inside of a conventional air conditioner for a vehicle. As shown in FIG. 1, the conventional air conditioner 1 for a vehicle includes a blower unit 10 and an air-conditioning unit 40. The blower unit includes a blower case 12, an indoor air and outdoor air converting door 15 and a blower wheel 16. The blower case 12 has indoor and outdoor air inlets 11 and 12 formed at an upper side thereof, and the indoor air and outdoor air converting door 15 is mounted to selectively open and close the indoor and outdoor air inlets 11 and 12. The blower 16 sends the indoor air and the outdoor air introduced through the indoor and outdoor air inlets 11 and 12 toward an air-conditioning case 49 by force.

The indoor air inlet 11 and the outdoor air inlet 12 are respectively formed at both sides of the upper side of the blower unit 10, and the blower unit 10 includes an intake unit having the indoor air and outdoor air converting door 15 which selectively opens and closes the indoor and outdoor air inlets 11 and 12 while rotating the indoor air inlet 11 and the outdoor air inlet 12.

The blower unit 10 includes: a blower motor 17 which is mounted inside the blower case 19 to blow axial air introduced from the indoor air inlet 11 or the outdoor air inlet 12 in a radial direction; and a blower wheel 16 which is joined to a rotary shaft of the blower motor 17. Moreover, the blower unit further includes an air filter 18 which is mounted at the upstream side of the blower motor 17 in an air flow direction in order to purify the introduced air.

The air-conditioning unit 40 includes an air-conditioning case 49, an evaporator 41 and a heater core 42. The air-conditioning case 49 has an air inflow port 43 which is formed at an entrance to induce the air blown from the blower unit 10 and a plurality of air outflow ports 44 which are formed at an exit to be opened and closed by mode doors 46. The evaporator 41 and the heater core 42 are mounted to be spaced apart from each other at a predetermined interval in order. A temperature-adjusting door 45 is mounted between the evaporator 41 and the heater core 42 to control temperature by adjusting an amount of mixture that cold air passing the evaporator 41 and warm air passing the heater core 42 are mixed together.

FIG. 2 is a front view of a conventional air blower. Referring to FIG. 2, the air blower 10 includes a blower wheel 16 which is connected to a rotary shaft of a blower motor 17 and is rotated to supply air to the inside of an air conditioner, and a blower control unit 50 which is disposed in a blower case 12 to control the stage of the blower. The blower control unit 50 controls voltage applied to the blower motor 17 through a user's manipulation of an air-conditioning controller or by automatic setting in order to control the stage of the blower.

That is, the blower motor 17 converts direct current electrical energy into rotational kinetic energy to generate a flow of air through rotation of the blower wheel. Furthermore, the blower control unit 50 includes a register, a field effect transistor (FET) which synthetically judges indoor and outdoor cooling and heating loads by various sensors to control the optimum rotational speed of the blower motor, and a pulse width modulator (PWM) for controlling the whole average voltage using the pulse width of a control signal.

However, conventional air conditioners have difficulty in creating a layout of components due to a small space of the blower unit because an ionizer, a motor, a control unit and so on must be mounted in the limited space. Furthermore, the conventional blower control unit has several disadvantages in that there is voltage drop at a wiring part and a part where a connector is connected and the number of holes for assembling various components to the blower unit and the number of holes for connecting wiring connectors are increased because the blower control unit is mounted at one side of the blower case, apart from the blower unit.

SUMMARY OF THE INVENTION

Accordingly, the present invention has been made in view of the above-mentioned problems occurring in the prior art, and it is an object of the present invention to provide an air conditioner for a vehicle which includes a blower motor and a blower control unit integrated with each other so that terminals between the blower motor and the blower control unit can be easily connected and a PCB is closely fixed to a flange with stronger power, and a method for manufacturing a blower unit of the same.

It is another object of the present invention to provide an air conditioner for a vehicle which optimizes a formation position of the blower control unit and a position of heating means.

To accomplish the above object, according to the present invention, there is provided an air conditioner for a vehicle including: blower unit having a blower motor and a blower wheel rotating by the blower motor to blow wind to the inside of an air-conditioning case; a blower control unit controlling voltage applied to the blower motor to control the rotational stage of the blower; a flange on which the blower motor is seated and fixed and to which a PCB of the blower control unit is joined to one side of the seating portion of the blower motor; a first terminal which is disposed to the blower motor; and a second terminal which is disposed on the PCB and is combined with the first terminal, wherein the blower control unit and the blower motor are formed integrally to the blower unit.

In another aspect of the present invention, there is provided an air conditioner for a vehicle including: blower unit having a blower motor and a blower wheel rotating by the blower motor to blow wind to the inside of an air-conditioning case; a blower control unit controlling voltage applied to the blower motor to control the rotational stage of the blower; a PCB which is arranged on the reverse side of the blower wheel in the lengthwise direction of a rotary shaft of the blower motor and on which a plurality of components are mounted; and a control unit cover for covering the PCB, wherein the blower control unit and the blower motor are formed integrally to the blower unit, wherein the blower control unit and the blower motor are formed integrally to the blower unit, the relatively larger components of the components which are mounted on the PCB are densely arranged at a region, and the control unit cover has a protrusion outwardly protrudes to accommodate the components mounted in the dense portion.

In a further aspect of the present invention, there is provided an air conditioner for a vehicle including: blower unit having a blower motor and a blower wheel rotating by the blower motor to blow wind to the inside of an air-conditioning case; a blower control unit controlling voltage applied to the blower motor to control the rotational stage of the blower; a blower cover for covering the blower motor, wherein the blower control unit is built in the blower cover so that the blower motor and the blower control unit are formed integrally to the blower unit.

The air conditioner for the vehicle according to the present invention is easy to assemble the blower unit, can settle the problem of voltage drop through a directly connected structure, is easy to maintain and repair because the blower motor and the PCB are detachably mounted, and can reduce the number of assembling processes.

Moreover, the air conditioner for the vehicle according to the present invention can minimize volume that protrudes outwardly from the limited space so as to secure an interior space of the vehicle and can enhance heat radiation through an effective arrangement of PCB components because the blower control unit and the blower unit are formed integrally.

Furthermore, the air conditioner for the vehicle according to the present invention can decrease manufacturing costs, effectively reduce the number of assembly holes, minimize a space loss of a passenger-side feet space, make it easy to insert a wiring to the connector, and secure a sufficient air volume for cooling a heat sink to prevent deterioration in durability of the blower control unit.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiments of the present invention with reference to the attached drawings.

Figure 1:
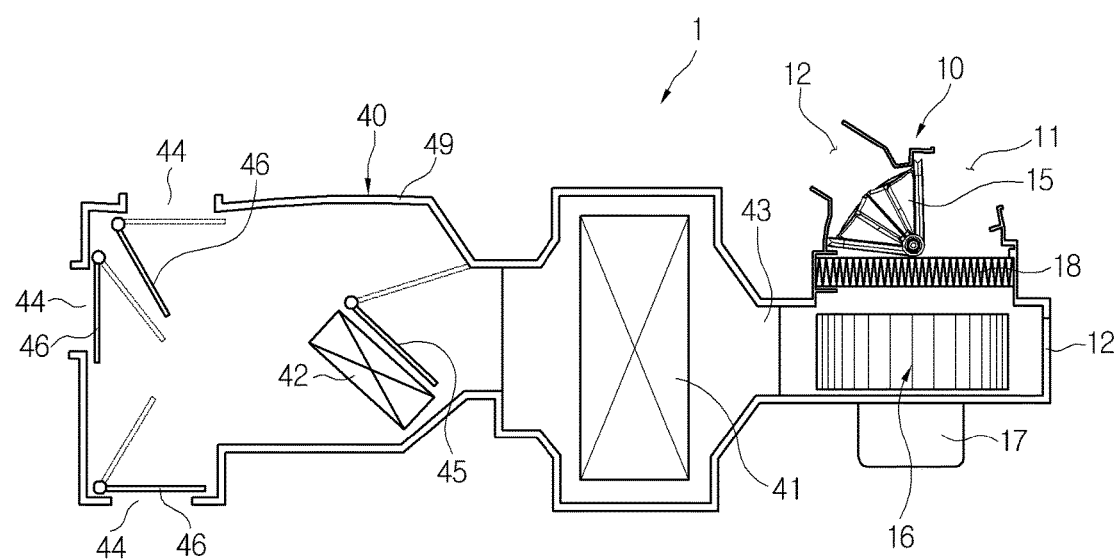
FIG. 1 is a sectional view showing the inside of a conventional air conditioner for a vehicle.
Figure 2:
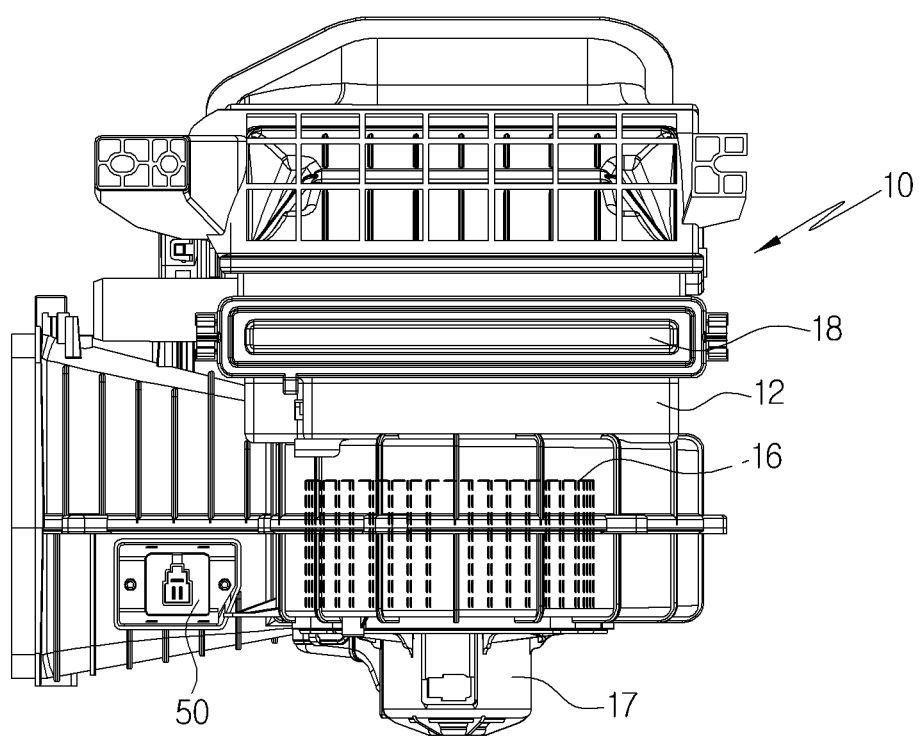
FIG. 2 is a front view of a conventional air blower.
Figure 3:
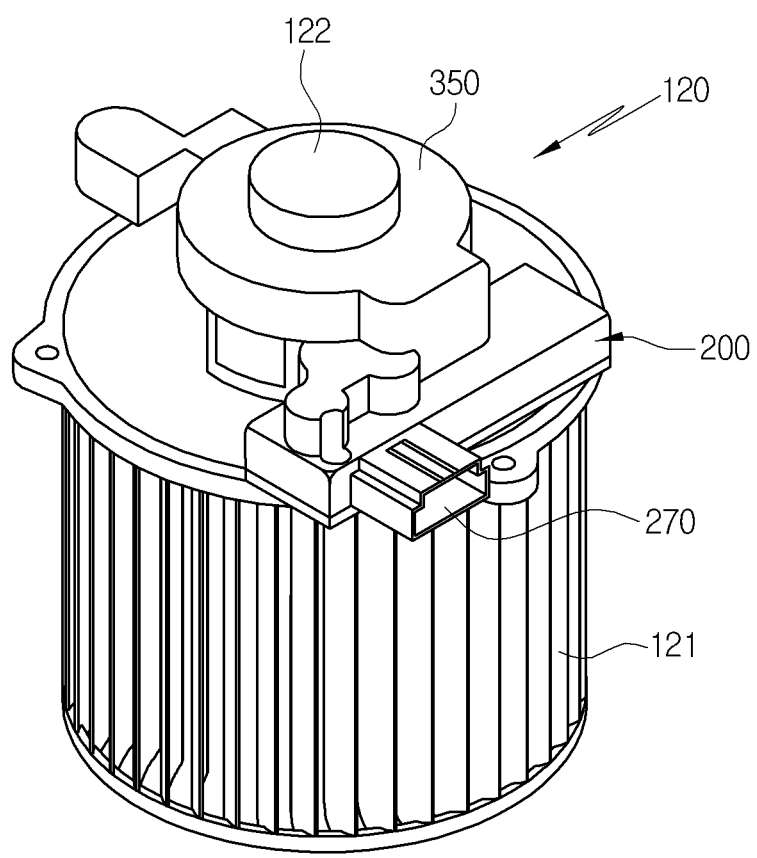
FIG. 3 is a rear side perspective view of a blower unit according to a first preferred embodiment of the present invention.
Figure 4:
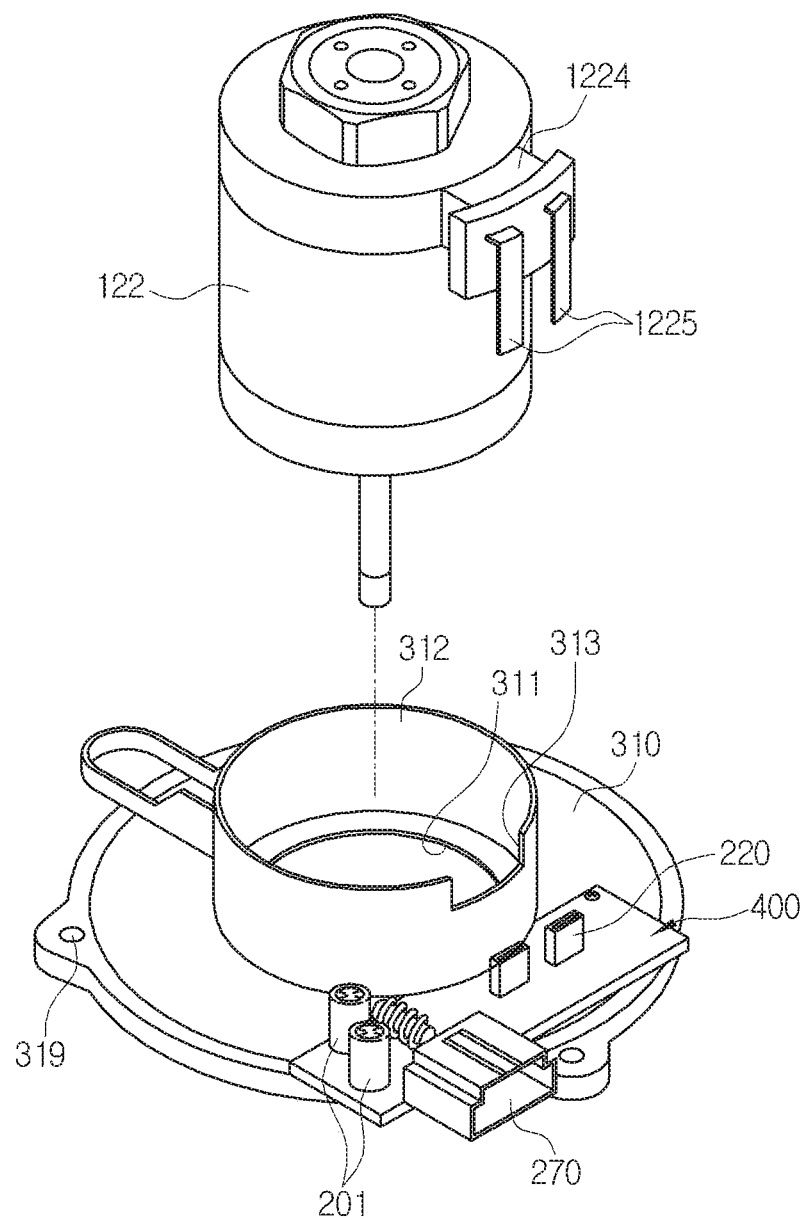
FIG. 4 is an exploded perspective view of a flange and a blower motor according to the first preferred embodiment of the present invention.
Figure 5:
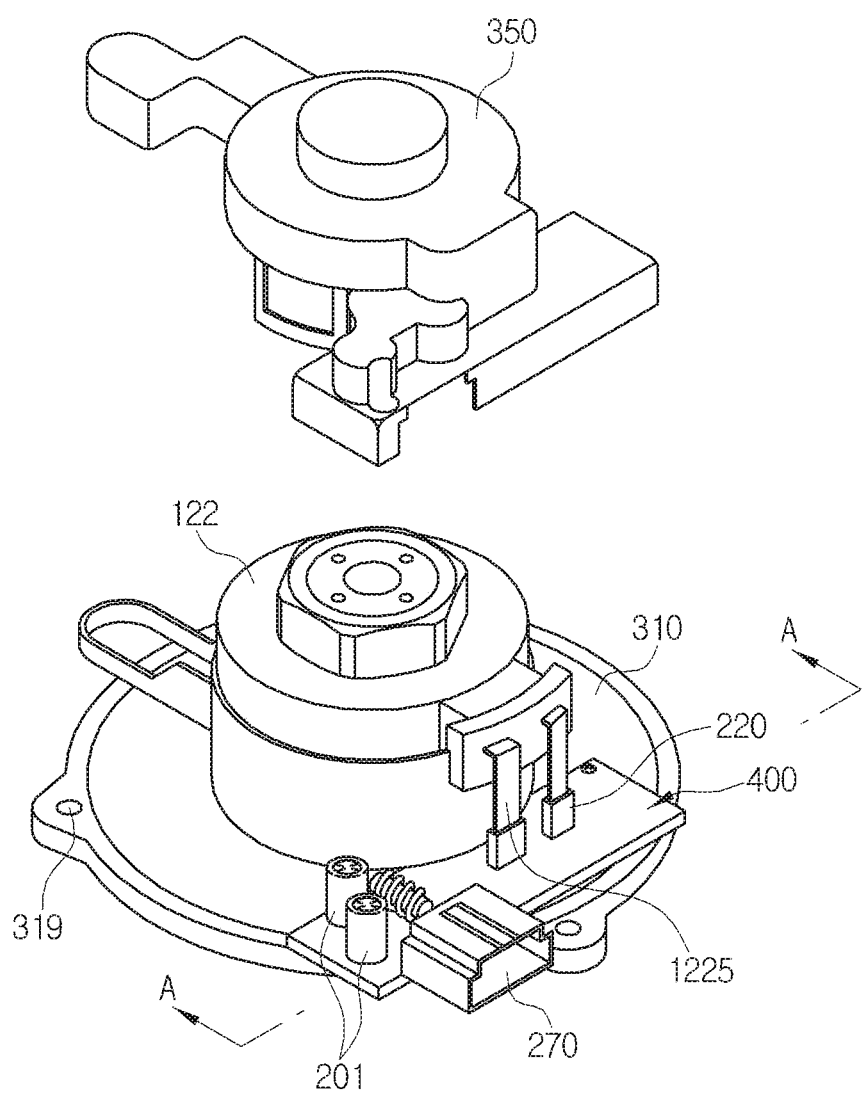
FIG. 5 is an exploded perspective view of the flange and a blower cover according to the first preferred embodiment of the present invention.
Figure 6:
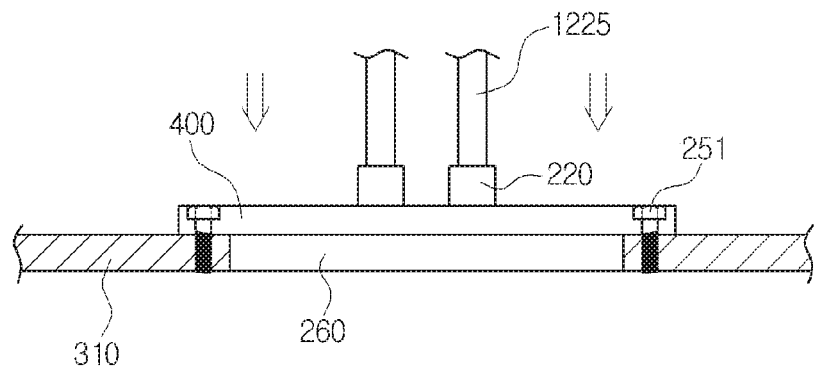
FIG. 6 is a sectional view taken along the line of A-A of FIG. 5.

FIG. 3 is a rear side perspective view of a blower unit according to a first preferred embodiment of the present invention, FIG. 4 is an exploded perspective view of a flange and a blower motor according to the first preferred embodiment of the present invention, FIG. 5 is an exploded perspective view of the flange and a blower cover according to the first preferred embodiment of the present invention, and FIG. 6 is a sectional view taken along the line of A-A of FIG. 5.

Referring to FIGS. 3 to 6, the air conditioner for the vehicle according to the first preferred embodiment of the present invention includes an air-conditioning unit and an air blowing unit. Detailed descriptions of the air-conditioning unit and the air-blowing unit will be omitted because the air-conditioning unit and the air-blowing unit are sufficiently described in the prior arts.

The air-blowing unit includes a blower unit 120. The blower unit 120 includes a blower motor 122 and a blower wheel 121.

The blower motor 122 is a brush type motor which converts direct current (DC) electrical energy into mechanical rotational kinetic energy. That is, the blower motor 122 converts DC electrical energy into rotational kinetic energy to generate a flow of air through rotation of the blower wheel.

The blower wheel 121 is connected to a rotary shaft of the blower motor 122 and rotates by the blower motor 122 to blow wind to the inside of an air-conditioning case so that axial air induced from an indoor air inlet or an outdoor air inlet formed at an upper part of a blower case is blown in a radial direction so as to be supplied to the inside of the air-conditioning case of the air-conditioning unit.

Additionally, the air-blowing unit 150 includes a blower control unit 200. The blower control unit 200 controls voltage applied to the blower motor 122 to control the rotational stage of the blower. The blower control unit 200 controls voltage applied to the blower motor 122 through a user's manipulation of an air-conditioning controller or by automatic setting in order to control the stage of the blower.

The blower control unit 200 includes a register, a field effect transistor (FET) which synthetically judges indoor and outdoor cooling and heating loads by various sensors to control the optimum rotational speed of the blower motor, and a pulse width modulator (PWM) for controlling the whole average voltage using the pulse width of a control signal.

The blower motor 122 and the blower control unit 200 are formed integrally to the blower unit 120. The blower control unit 200 and the blower motor 122 for rotating the blower wheel 121 are integrated into one, so that the whole size of the air conditioner can be reduced through minimization of a product housing and concentration of components and manufacturing costs can be also reduced through simplification of the assembly method.

The blower unit 120 includes a flange 310, a first terminal 1225 and a second terminal 220.

The blower motor 122 is seated and fixed on the flange 310, and a PCB 400 of the blower control unit 200 is joined to one side of the seated portion of the blower motor. The PCB 400 is in the form of an approximately rectangular plate, and includes a plurality of elements 201 disposed on one side thereof and a connector 270 disposed at one side to be connected with an outdoor wiring. FIG. 3 illustrates the blower control unit 200, but the blower control unit 200 actually means the PCB 400 disposed inside a blower cover 350. The flange 310 includes a motor insertion hole 311 for inserting the blower motor 122 therein and a coupling hole 319 formed to join the flange to the blower case.

The first terminal 1225 is made with a conductive rigid material such as metal, and is disposed to protrude outwardly from the blower motor 122. The first terminal 1225 has a long and hard plate structure with a predetermined thickness. When the wiring of the vehicle is connected to the connector 270 in a state where the first terminal 1225 and the second terminal 220 are connected with each other, the blower motor 122 is operated.

The second terminal 220 is constructed such that the first terminal 1225 is capable of being inserted into the second terminal, and has a conductive rigid material, such as metal, therein so as to be electrically connected with the first terminal 1225 when the first terminal 1225 is inserted. The second terminal 220 is disposed on the PCB 400. In this embodiment, the first terminal 1225 is a male terminal and the second terminal 220 is a female terminal, but the positions of the first and second terminals 1225 and 220 may be arranged in reverse.

When the blower motor 122 is inserted and assembled into the flange 310 in a state where the PCB 400 is fixed to the flange 310, at the same time, the first terminal 1225 is inserted into the second terminal 220 at the same time so as to be automatically coupled with each other. Therefore, the blower unit is assembled easily because any wire is not connected between the blower motor 122 and the PCB 400.

If the blower motor and the PCB are connected with each other through an additional wire, it unavoidably causes voltage drop, but the problem of voltage drop is settled through the direct connection structure between the first terminal 1225 and the second terminal 220. For reference, in the case that the blower motor and the PCB are connected with each other through a wire, because weld treatment must be carried out in order to prevent voltage drop, the blower motor and the PCB cannot be separated from each other at the time of maintenance or repair. The direct connection structure of the first terminal 1225 and the second terminal 220 facilitates detachable mounting between the blower motor and the PCB and the number of assembling processes is reduced because the weld treatment is omitted.

The first terminal 1225 extends from the lateral side of the blower motor 122 in the lengthwise direction of a rotary shaft of the blower motor, namely, in the vertical direction. The first terminal 1225 extends from the lateral side of the blower motor 122 in the axial direction, is bent in the form of a "−" shape, and then extends in the downward direction, namely, in the direction to face the second terminal.

The second terminal 220 extends from the PCB 250 toward the first terminal 1225 so that the first terminal 1225 is inserted into the second terminal 220. The PCB 400 is joined to one side of the flange 310, namely, to the opposite side of the flange on which the blower wheel 121 is located. The second terminal 220 extends to protrude from the exposed lateral surface of the PCB 400 and has a groove to which the first terminal 1225 is inserted.

When the first terminal 1225 is inserted into the second terminal 220, an end of the first terminal 1225 pressurizes the second terminal 220 in the lengthwise direction of the rotary shaft of the blower motor. In other words, when the first terminal 1225 is completely inserted into the second terminal 220, the end of the first terminal 1225 gets in close contact with the bottom surface of the groove of the second terminal 220 so as to press the PCB 400 toward the flange 310. Finally, the PCB 400 is fixed between the flange 310 and the blower motor 122 in the form of sandwich.

Because the hard first terminal 1225 of the blower motor 122 presses the PCB 400 while being fixed to the second terminal 220 of the PCB 400, the PCB 400 is pressed more to the flange 310 so that fixation power is strengthened and inner flow or transformation in a finished product is minimized.

That is, the first terminal 1225 extends from the lateral side of the blower motor 122 in the direction that the blower motor and the flange are joined. The second terminal 220 is formed at the position corresponding to the first terminal 1225. In this instance, the blower motor 122 is joined to the flange 310, and at the same time, the blower motor 122 and the PCB 400 are joined.

The blower unit 120 has the blower cover 350. The blower cover 350 is joined to one side of the flange 310 on which the PCB 400 is fixed, and covers an end portion of the opposite side of the rotary shaft of the blower motor 122 and the PCB 400. The blower cover 350 supports and restricts the blower motor 122 in the lengthwise direction of the rotary shaft of the blower motor relative to the flange 310. When the blower cover 350 is joined to the flange 310, the blower motor 122 is fixed between the blower cover 350 and the flange 310 so as to reinforce fixation power between the first terminal 1225 and the second terminal 220.

The flange 310 has a seating wall 312 disposed on the side where the PCB 400 is fixed. The seating wall 312 protrudingly extends to surround at least a part of the outer peripheral surface of the blower motor 122 so as to support and restrict the blower motor 122 in the radial direction. The seating wall 312 fixes and supports the blower motor 122 not to be moved in the radial direction. Moreover, an extension jaw 1224 extends in the lateral direction from the blower motor 122. The first terminal 1225 is disposed on the extension jaw 1224.

The seating wall 312 has a fitting recess 313. When the blower motor 122 is seated on the flange 310, the extension jaw 1224 is fit to the fitting recess 313 to support and restrict the blower motor 122 in the circumferential direction. The fitting recess 313 formed in the seating wall 312 is joined with the extension jaw 1224 in order to fix and support the blower motor not to be moved in the circumferential direction and enhance assembly efficiency and prevent misassembly by guiding the blower motor into the assembly direction when the blower motor is assembled.

The blower unit 120 includes a heat sink 260 which serves to generate heat. The heat sink 260 gets in contact with the reverse side of the PCB 400 on which the second terminal 220 is formed, and is fixed to the flange 310. The heat sink 260 is arranged to be exposed in the same direction as the blower wheel 121 in the lengthwise direction of the rotary shaft of the blower motor. One side of the heat sink 260 gets in contact with the PCB 400, and the other side is exposed to the air to radiate heat generated from the PCB 400. That is, it means that the exposed side of the heat sink 260 is exposed from the inside of the blower case. The heat sink 260 radiates heat by the air blown from the inside of the blower case.

The second terminal 220 is arranged in an area overlapped with the heat sink 260. When the first terminal 1225 presses the second terminal 220 and the PCB 400 comes into contact with the flange 310, at the same time, the PCB 400 comes into contact with the heat sink 260. Because the second terminal 220 is arranged at the area overlapped with the heat sink 260, when the first terminal 1225 presses the second terminal 220, the PCB 400 comes into perfectly close contact with the heat sink 260 to enhance heat radiation performance.

Figure 7:
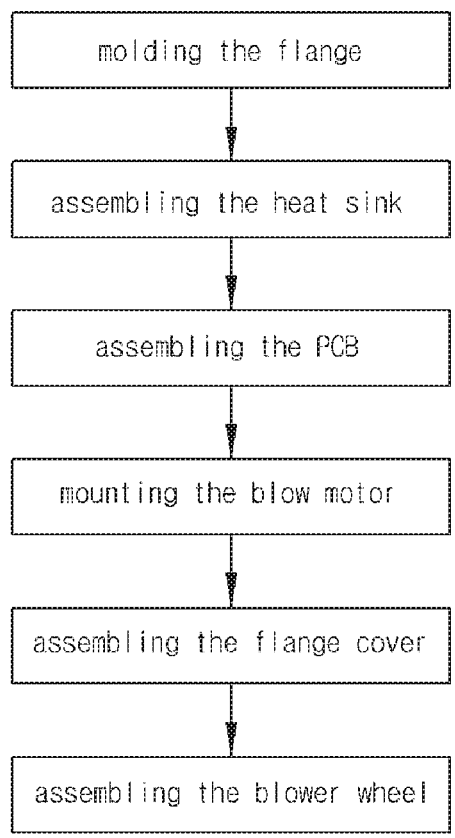
FIG. 7 is a flow chart showing an assembly sequence of the blower unit according to the first preferred embodiment of the present invention.

FIG. 7 is a flow chart showing an assembly sequence of the blower unit according to the first preferred embodiment of the present invention.

Referring to FIG. 7, the assembly sequence of the blower unit according to the first preferred embodiment of the present invention will be described. A method for manufacturing the blower unit according to the first preferred embodiment of the present invention includes the steps of: molding the flange 310; fixing the heat sink 260 to the flange 310; joining the PCB 400 to the flange 310; mounting the blower motor 122 to the flange 310; joining the blower cover 350 to the flange 310; and combining the blower wheel 121 to the rotary shaft of the blower motor 122.

In other words, first, the flange is injection-molded, and then, the heat sink is fixed to the flange. The PCB is joined to the rear side of the flange using a screw. After that, the blower motor is mounted on the flange. In this process, the first terminal of the blower motor is automatically joined to the second terminal of the PCB. After that, the blower cover is joined to the flange, and then, the blower wheel is fit and combined to the rotary shaft of the blower motor on the front side of the flange.

Figure 8:
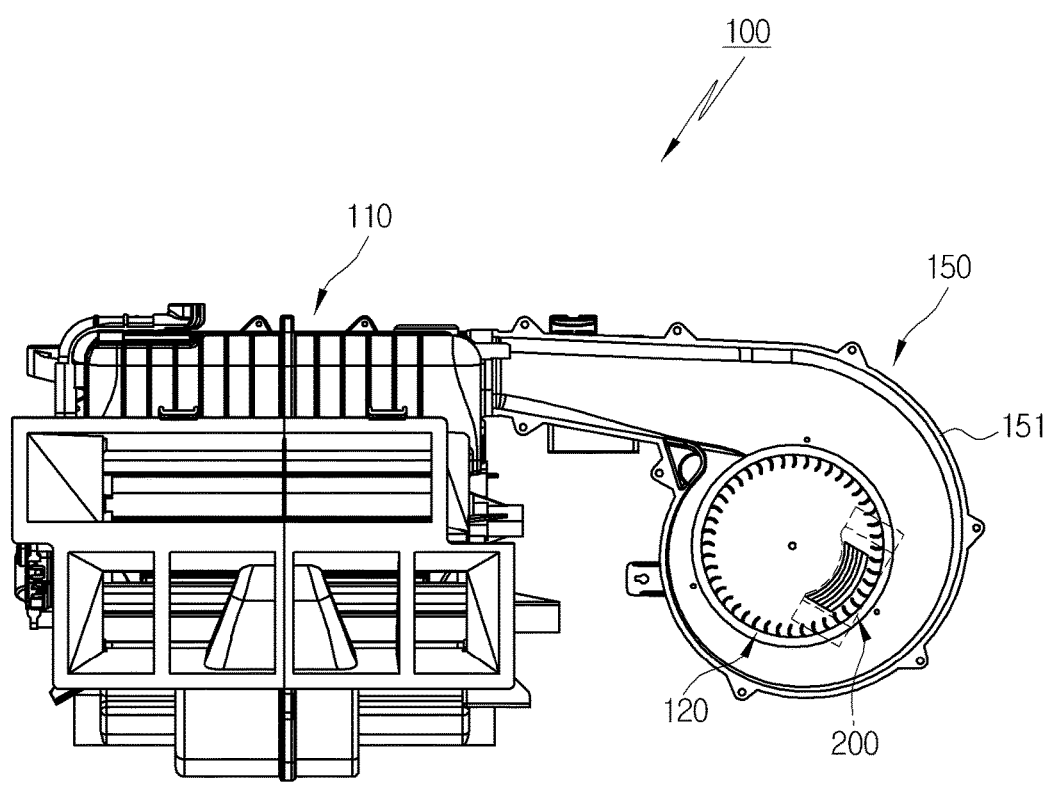
FIG. 8 is a plan view of an air conditioner for a vehicle, showing the inside of an air blower according to a second preferred embodiment of the present invention.
Figure 9:
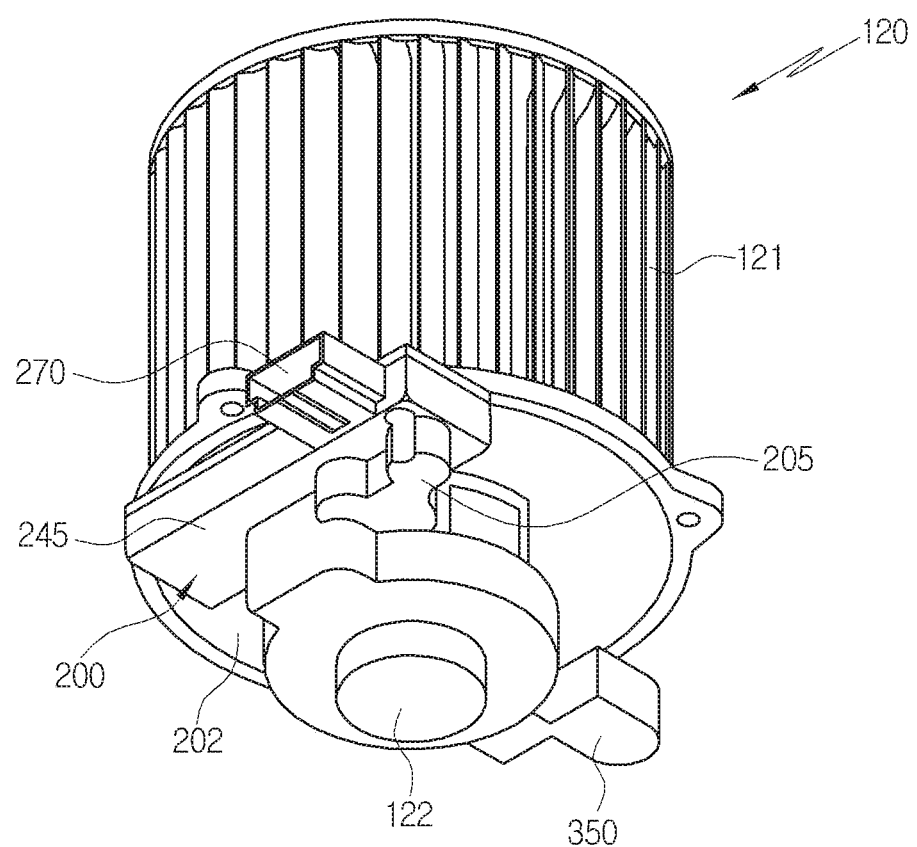
FIG. 9 is a rear side perspective view of a blower unit according to the second preferred embodiment of the present invention.
Figure 10:
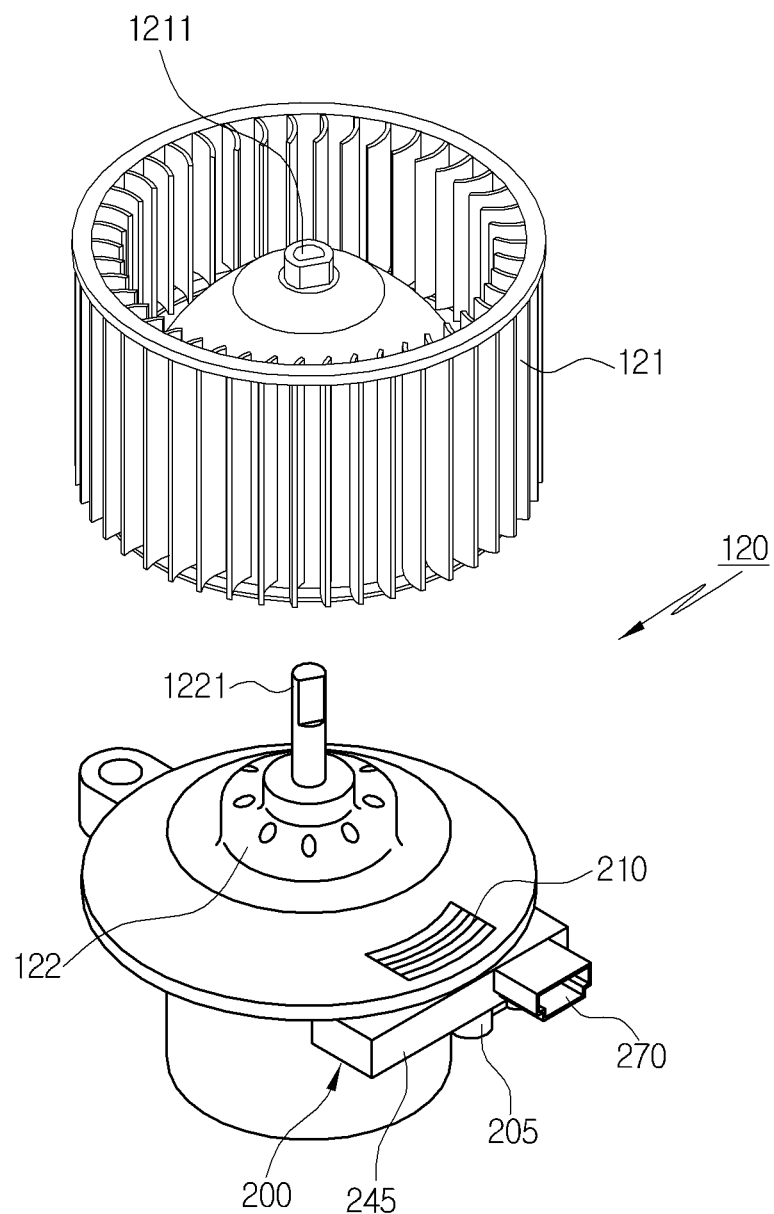
FIG. 10 is an exploded perspective view of the blower unit according to the second preferred embodiment of the present invention.
Figure 11:
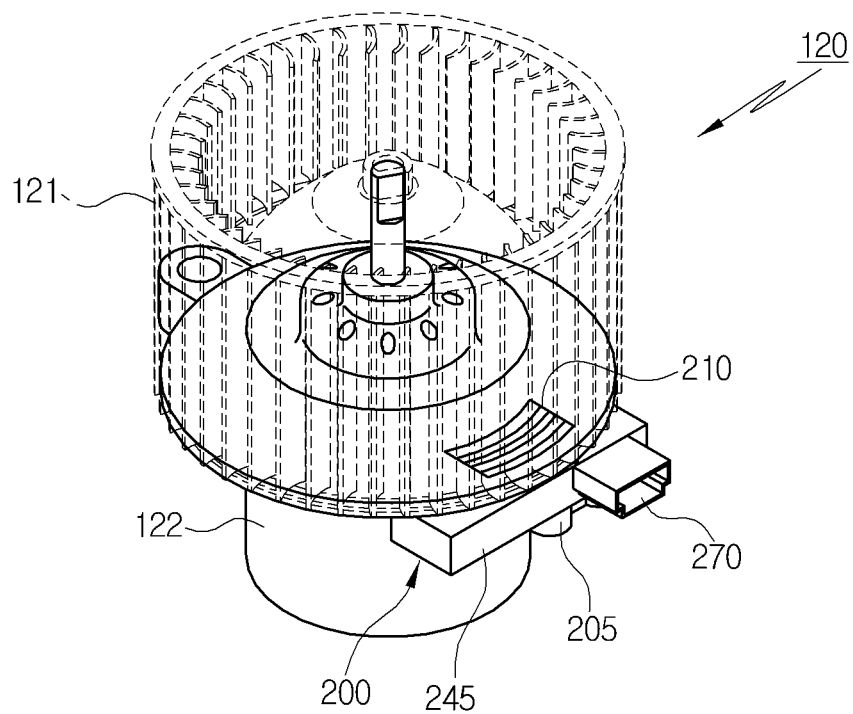
FIG. 11 is a perspective view of the blower unit according to the second preferred embodiment of the present invention.

FIG. 8 is a plan view of an air conditioner for a vehicle, showing the inside of an air blower according to a second preferred embodiment of the present invention, FIG. 9 is a rear side perspective view of a blower unit according to the second preferred embodiment of the present invention, FIG. 10 is an exploded perspective view of the blower unit according to the second preferred embodiment of the present invention, and FIG. 11 is a perspective view of the blower unit according to the second preferred embodiment of the present invention.

As shown in FIGS. 8 to 11, the air conditioner 100 for the vehicle according to the second preferred embodiment of the present invention includes an air-conditioning unit 110 and an air-blowing unit 150.

The air-conditioning unit 110 includes an air-conditioning case, and an evaporator and a heater core is disposed inside the air-conditioning case. The air-conditioning unit 110 is constructed to receive air blown from the air-blowing unit 150 and selectively discharge the received air to a plurality of air outflow ports. The evaporator and the heater core are mounted to be spaced apart from each other at a predetermined interval in order inside the air-conditioning case.

The air-blowing unit 150 includes a blower case 151 and a blower unit 120. The blower case 151 has indoor and outdoor air inlets formed in the upper side thereof. The blower unit 120 includes a blower motor 122 and a blower wheel 121.

The blower motor 122 is a brush type motor which converts direct current (DC) electrical energy into mechanical rotational kinetic energy. The blower wheel 121 is connected to a rotary shaft of the blower motor 122 and rotates by the blower motor 122 to blow wind to the inside of an air-conditioning case so that axial air induced from an indoor air inlet or an outdoor air inlet formed at an upper part of a blower case is blown in a radial direction so as to be supplied to the inside of the air-conditioning case of the air-conditioning unit. The air-blowing unit 150 includes a blower control unit 200. The blower motor 122 converts DC electrical energy into rotational kinetic energy to generate a flow of air through rotation of the blower wheel. The blower motor 122 and the blower control unit 200 are formed integrally to the blower unit 120.

The blower control unit 200 is arranged at the opposite side of the blower wheel 121 in the lengthwise direction of the rotary shaft of the blower motor. The blower unit 120 includes a flange 202. The blower motor 122 is seated and fixed on the flange 202, and the PCB 400 of the blower control unit 200 is combined to one side of the seated portion of the blower motor. That is, the blower control unit 200 is formed at the opposite side of the blower wheel 121 based on the flange 2020.

The PCB 400 is in the form of an approximately rectangular plate which is long in the transverse direction. The PCB 400 is combined to one of both sides of the flange 202, namely, the opposite side of the blower wheel 121. In this instance, in a state where the air conditioner 100 is installed in the vehicle, the blower wheel 121 is located at the upper part and the PCB 400 is located at the lower part.

Figure 12:
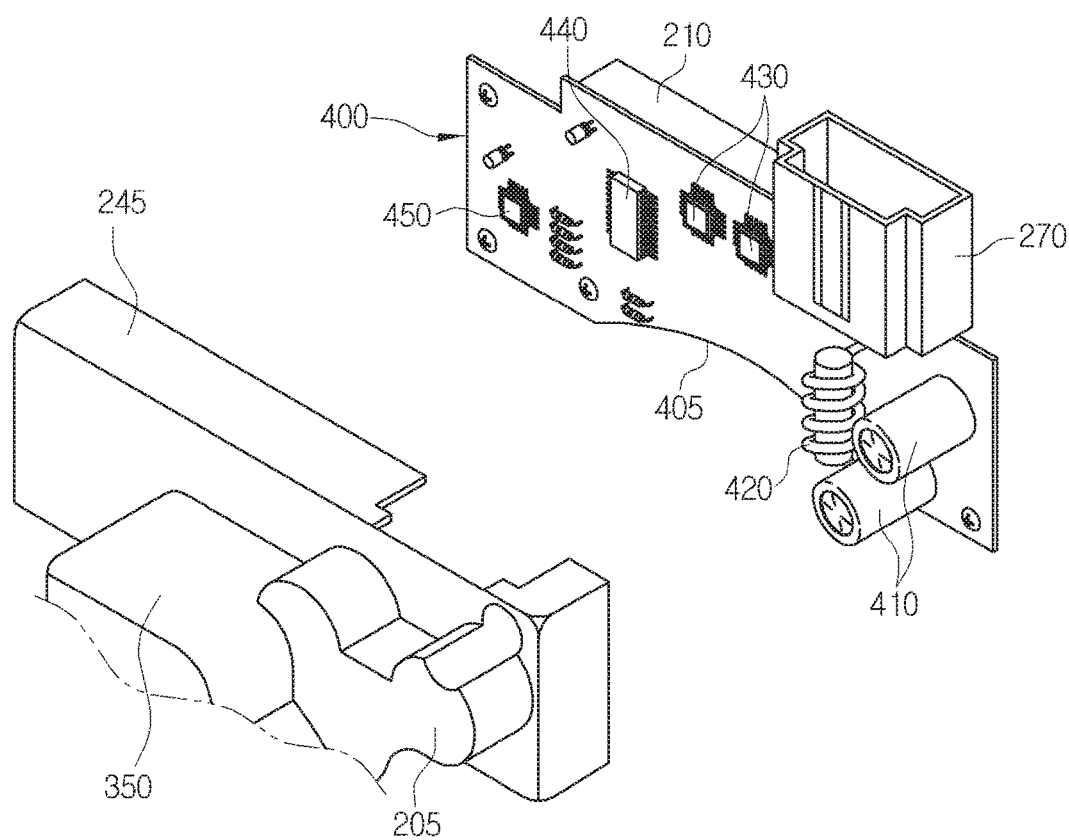
FIG. 12 is a perspective view showing a PCB and a control unit cover according to the second preferred embodiment of the present invention.

The blower unit 120 includes the PCB 400 on which a plurality of components are mounted, and a control unit cover 245 for covering the PCB 400. FIG. 12 is a perspective view showing a PCB and a control unit cover according to the second preferred embodiment of the present invention. Referring to FIG. 12, the components mounted on the PCB 400 are an FET element 430, a MICOM element 450, a SHUNT element 440 for measuring electric current, a capacitor 410 for an EMC, and a coil 420. A connector 270 is disposed at one side of the PCB 400 to be connected with an outdoor wiring.

The relatively larger components which are mounted on the PCB 400 are densely arranged at a part. The relatively larger components are the capacitor 410, the coil 420 and others. In this instance, the relatively larger components are concentrated as close as possible.

Moreover, the components which are relatively sensitive to heat are arranged at the edge part of the PCB 400. The components which are relatively sensitive to heat are the MICOM element 450 and others.

The control unit cover 245 includes a flat portion and a protrusion 205 in which the relatively larger components are mounted at the dense portion to protrude, and has a predetermined space part therein as much as the protruding volume. The protrusion 205 accommodates the components mounted at the dense portion. In the state where the air conditioner 100 is installed in the vehicle, the control unit cover 245 and the protrusion 205 all protrude in the downward direction, and the protrusion 205 protrudes to the lowermost side.

Furthermore, the relatively larger components and the relatively smaller components are respectively arranged at the left side and the right side as thick as possible based on the center of a substrate. The relatively larger components of the PCB are densely arranged at a part and the control unit cover 245 has the protrusion for accommodating the relatively larger components so as to minimize the volume of the housing which protrudes outwardly, namely, in the downward direction.

The blower unit 120 includes a blower cover 350. The blower cover 350 is joined to one side of the flange 202 where the PCB 400 is fixed, and covers an end portion of the opposite side of the rotary shaft of the blower motor 122. The blower cover 350 supports and fixes the blower motor 122 in the lengthwise direction of the rotary shaft of the blower motor relative to the flange 202. The blower cover 350 and the control unit cover 245 may be injection-molded integrally.

Figure 13:
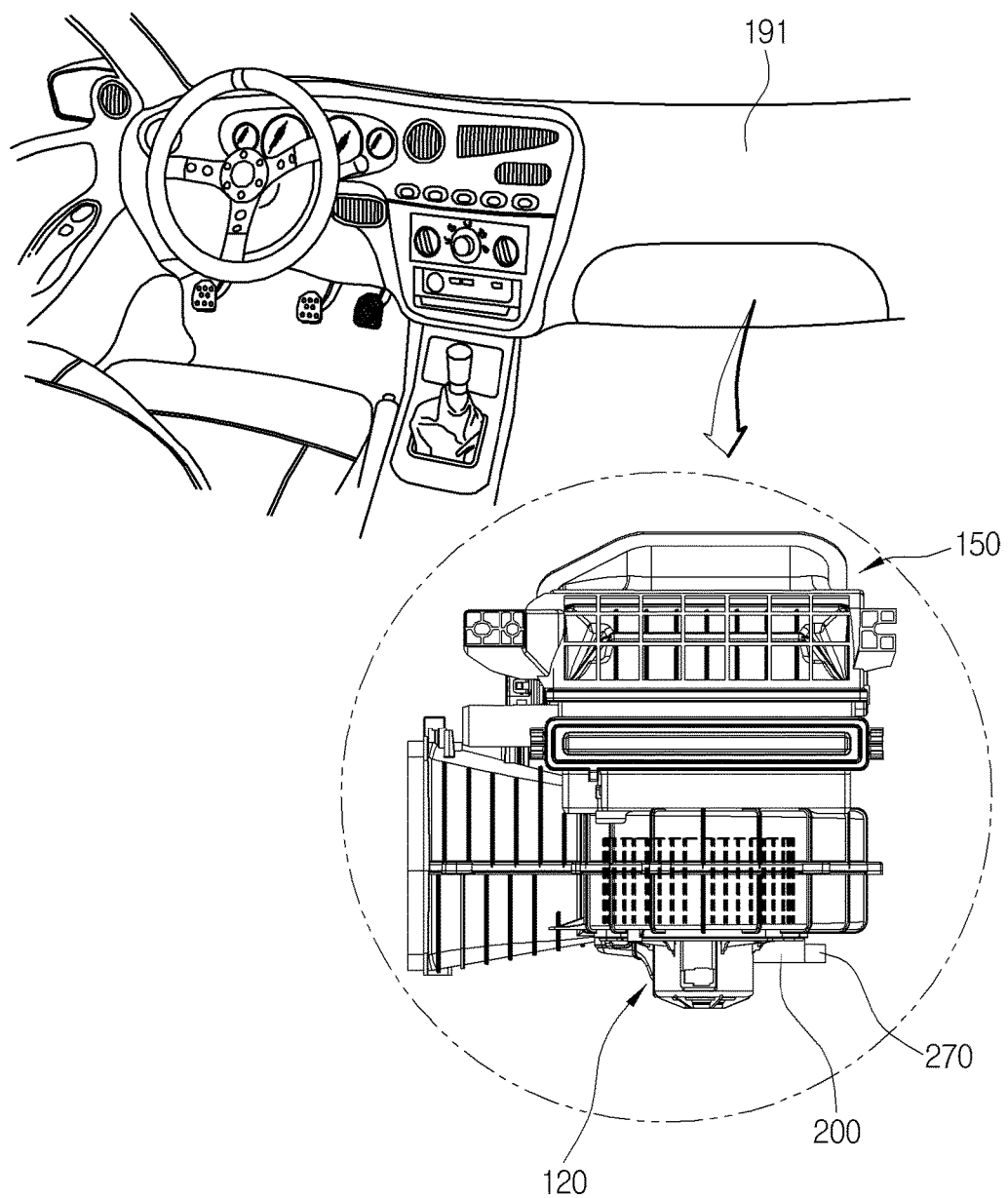
FIG. 13 is a view showing a position that the air blower according to the second preferred embodiment of the present invention is installed in the vehicle.
Figure 14:
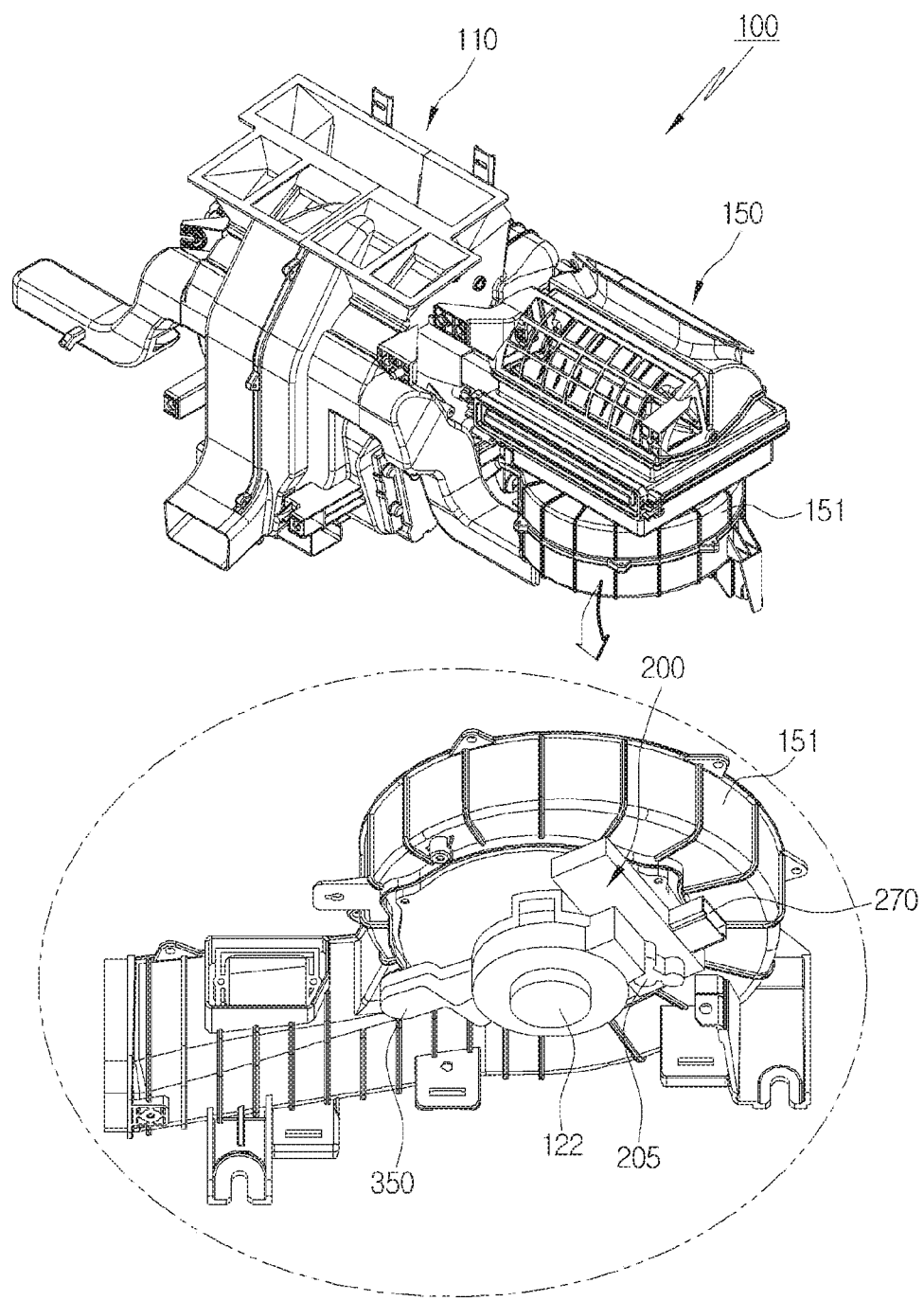
FIG. 14 is a view for explaining the optimum position of a protrusion part according to the second preferred embodiment of the present invention.

FIG. 13 is a view showing a position that the air blower according to the second preferred embodiment of the present invention is installed in the vehicle, and FIG. 14 is a view for explaining the optimum position of a protrusion part according to the second preferred embodiment of the present invention.

Referring to FIGS. 13 and 14, the optimum arrangement of the protrusion will be described. The protrusion 205 is arranged outwardly in the vehicle width direction. In more detail, the protrusion 205 is arranged at the furthermost edge from the air-conditioning case in the width direction of the PCB 400. Additionally, the protrusion 205 is arranged at the opposite side region of the air-conditioning case based on the rear of the blower motor 122 relative to the antero-posterior direction of the vehicle and based on the blower motor 122 relative to the transverse direction of the vehicle. In addition, the connector 270 is arranged near to the area where the relatively larger components are arranged densely. Through the arrangement of the connector 270, in the same way as the protrusion, the connector makes connection of the wiring easy without occupying the space for a passenger in order to allow convenient maintenance and repair.

The air conditioner according to the second preferred embodiment of the present invention adopts a left hand drive type (LHD) that the driver's seat is located at the left of the vehicle and the passenger seat is located at the right of the vehicle. Hereinafter, all directions will be described based on the LHD type vehicle. However, in a case that the characteristic parts of the present invention are applied to a right hand drive (RHD) type vehicle, the mounted location of the protrusion will be reversed in the left and right direction relative to the LHD type vehicle.

The air conditioner 100 is located inside a cockpit module, and the air-blowing unit 150 in which the blower motor 122 is mounted is located at an area where a passenger's feet are located. The driver's seat cannot secure a space because steering wheels, a brake, various accelerators and others are located at the driver's seat side. Therefore, in order to secure the feet space of the passenger seat, the length of the protrusion 205 which downwardly protrudes must be minimized.

The opposite side region of the air-conditioning case based on the rear of the blower motor 122 relative to the antero-posterior direction of the vehicle and based on the blower motor 122 relative to the transverse direction of the vehicle is an approximately rear and right area based on the blower motor 122. The protrusion 205 arranged in such an area is located diagonally relative to the blower motor 122. Moreover, the protrusion 205 is arranged at the furthermost edge, namely, at the right side edge, from the air-conditioning case in the width direction of the PCB 400 so as to secure the widest space for the passenger's feet.

The PCB 400 includes a heat sink 210 for generating heat. The heat sink 210 gets in contact with the opposite side of the side where components of the PCB 400 are mounted, and is fixed on the flange 202. The heat sink 210 is arranged to be exposed in the same direction as the blower wheel 121 in the lengthwise direction of the rotary shaft of the blower motor. One side of the heat sink 210 gets in contact with the PCB 400 and the other side is exposed to the air to radiate heat generated from the PCB 400. That is, the exposed surface of the heat sink 210 is exposed from the inside of the blower case. The heat sink 210 radiates heat by the air blown from the inside of the blower case.

The heat sink 210 is arranged at the central portion of the PCB 400. When the heat sink 210 is located at the central portion of the PCB 400, heat radiation effect of the PCB module can be maximized. Furthermore, the components with relatively higher heat generation are arranged in an area overlapped with the heat sink 210. The components with relatively lower heat generation are FET elements 430 and others. Therefore, the components with the relatively higher heat generation are located as close as possible to the heat sink 210 in order to enhance heat radiation efficiency.

The PCB 400 is adjacent to the blower motor 122 to be partly overlapped with the blower motor 122 and is joined to the flange 202. The PCB 400 has a concave part 405 formed at the edge of the middle part in the width direction. The concave part 405 is formed in an annular shape corresponding to the shape of the blower motor 122 so that some of the outer peripheral portion of the blower motor 122 can be inserted into the concave part without interference with the blower motor 122. The concave part 405 makes the PCB 400 arranged as close as possible to the blower motor 122 so that the motor housing is not restricted in its shape.

Figure 15:
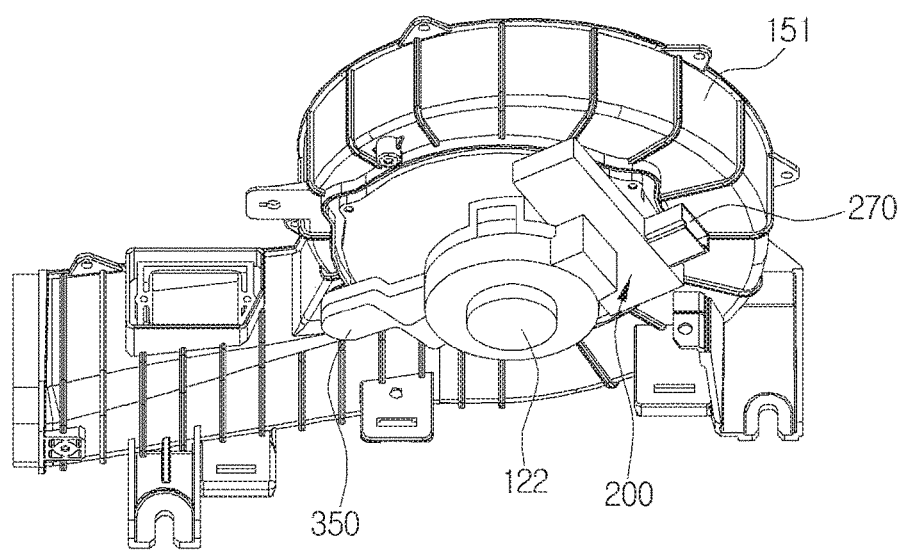
FIG. 15 is a rear side perspective view showing a part of an air blower according to a third preferred embodiment of the present invention.
Figure 16:
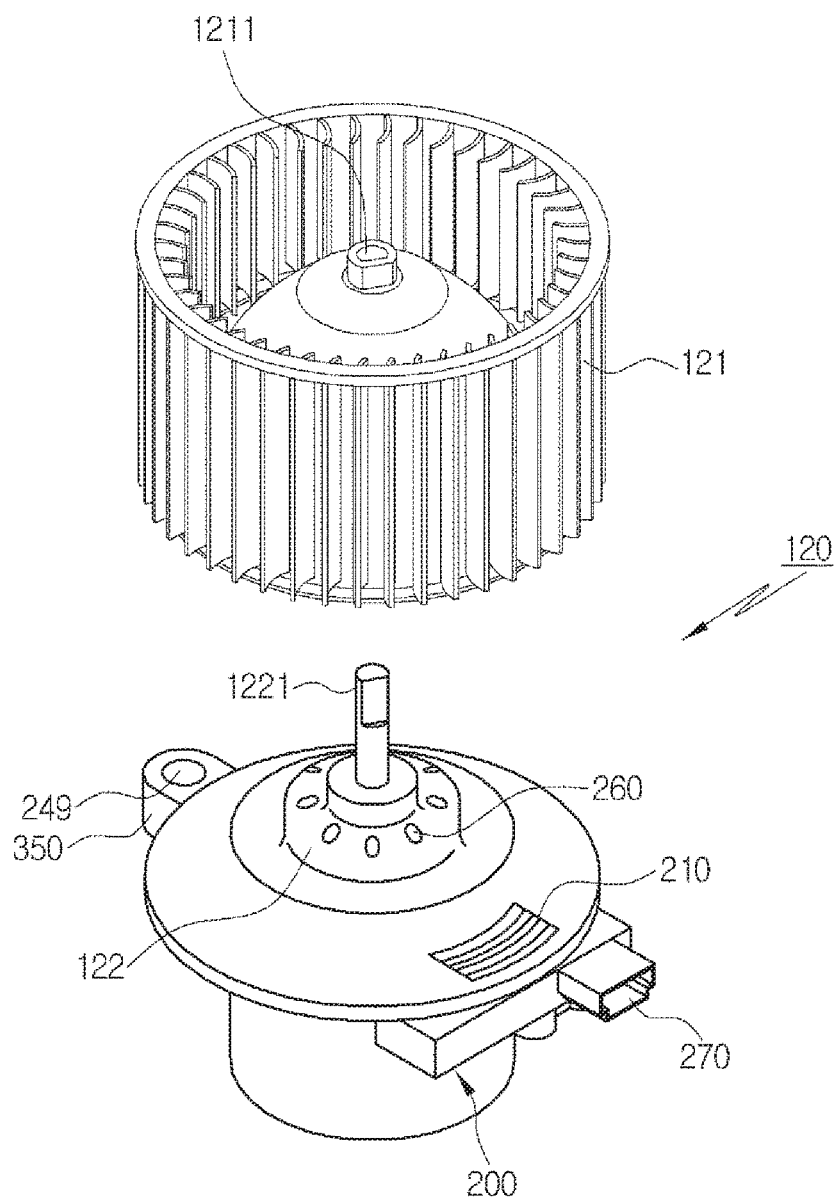
FIG. 16 is an exploded perspective view of a blower unit according to the third preferred embodiment of the present invention.
Figure 17:
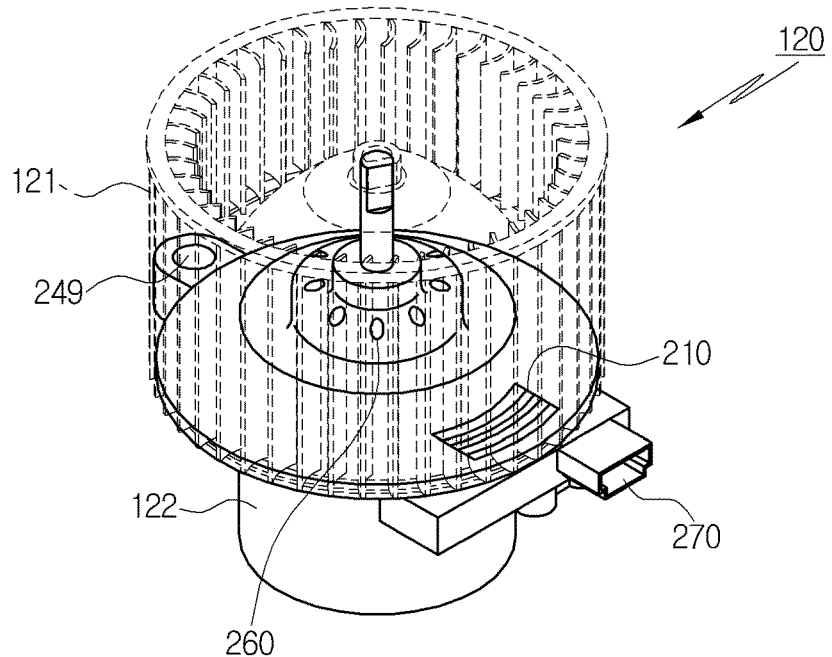
FIG. 17 is a perspective view of the blower unit according to the third preferred embodiment of the present invention.

FIG. 15 is a rear side perspective view showing a part of an air blower according to a third preferred embodiment of the present invention, FIG. 16 is an exploded perspective view of a blower unit according to the third preferred embodiment of the present invention, and FIG. 17 is a perspective view of the blower unit according to the third preferred embodiment of the present invention.

As shown in FIGS. 15 to 17, the air conditioner for the vehicle according to the third preferred embodiment of the present invention includes an air-conditioning unit and an air-blowing unit. The air-blowing unit 150 includes a blower case 151 and a blower unit 120. The blower case 151 has indoor and outdoor air inlets formed in the upper side thereof. The blower unit 120 includes a blower motor 122 and a blower wheel 121.

The blower wheel 121 is connected to a rotary shaft of the blower motor 122 and rotates by the blower motor 122 to blow wind to the inside of an air-conditioning case so that axial air induced from an indoor air inlet or an outdoor air inlet formed at an upper part of a blower case is blown in a radial direction so as to be supplied to the inside of the air-conditioning case of the air-conditioning unit.

Additionally, the air-blowing unit 150 includes a blower control unit 200. The blower control unit 200 controls voltage applied to the blower motor 122 to control the rotational stage of the blower. The blower control unit 200 controls voltage applied to the blower motor 122 through a user's manipulation of an air-conditioning controller or by automatic setting in order to control the stage of the blower.

Particularly, the blower motor 122 and the blower control unit 200 are formed integrally to the blower unit 120. That is, the blower unit 120 includes a blower cover 350 for covering the blower motor 122. The blower control unit 200 is built in the blower cover 350 so that the blower motor 122 and the blower control unit 200 are formed integrally to the blower unit 120.

The blower control unit 200 and the blower motor 122 for rotating the blower wheel 121 are integrated into one, so that the whole size of the air conditioner can be reduced through minimization of a product housing and concentration of components and manufacturing costs can be also reduced through simplification of the assembly method.

The blower cover 350 serves to support, fix and protect the blower motor 122, and the blower control unit 200 is built in the single blower cover 350 integrally with the blower motor 122, thereby reducing manufacturing costs and more effectively reducing the number of assembly holes.

The blower control unit 200 is arranged at the opposite side of the blower wheel 121 based on a flange for joining the blower motor 122 to the case. In more detail, the blower control unit 200 is arranged at the opposite side of the blower wheel 121 in the lengthwise direction of the rotary shaft of the blower motor, and is also arranged on the side of the blower motor 122. The blower motor 122 is fixed to an approximately disc-shaped flange member. A rotary shaft 1221 protrudes in the direction of the blower wheel, namely, in the upward direction. The rotary shaft 1221 is inserted into a coupling hole 1211 of the blower wheel 121 so that the blower motor 122 and the blower wheel 121 are combined together.

Some of the blower motor 122 protrudes at the opposite side of the flange member to which the blower wheel 121 is combined. The blower control unit 200 is assembled to be located at the opposite side of the flange member to which the blower wheel 121 is combined. The blower cover 350 is joined to the flange member to cover some or the entire of the protruding blower motor 122, and covers the blower control unit 200 together with the blower motor 122.

The blower motor 122 protrudes over the flange member in the opposite direction of the blower wheel, namely, in the downward direction in a completely assembled state, and the blower control unit 200 protrudes less than the blower motor. Considering the entire package of the air conditioner, the lowermost portion of the blower control unit is higher than the lowermost portion of the blower motor not to increase the whole size of the air conditioner.

Because the blower control unit 200 is arranged at the opposite side of the blower wheel 121 in the lengthwise direction of the rotary shaft of the blower motor, due to the protruding portion of the blower motor, a dead space which is not used can be utilized, and difficulty in creating a layout of components inside a small space can be settled because the air conditioner does not need any additional space for constructing the blower control unit.

The blower control unit 200 includes a heat sink 210 which generates heat. The heat sink 210 is arranged to be exposed in the same direction as the blower wheel 121 in the lengthwise direction of the rotary shaft of the blower motor. The heat sink 210 is heat radiation means, and one side of the heat sink 260 gets in contact with the PCB 400 and the other side is exposed to the air to radiate heat generated from the PCB 400. That is, it means that the exposed side of the heat sink 260 is exposed from the inside of the blower case. The heat sink 260 radiates heat by the air blown from the inside of the blower case.

At least a part of the heat sink 210 is located within a range of a rotation radius of the blower wheel 121. A helical flow of air is generated around the blower wheel 121 by rotation of the blower wheel 121, and the heat sink 210 is located inside the air flow so as to enhance heat radiation efficiency. Moreover, in an aspect of space utilization, the heat sink 210 is located within the rotation radius of the blower wheel 121 to prevent the size of the air conditioner from increasing in the radial direction.

The heat sink 210 may have a radiation fin structure to increase a heat exchange area, and it is preferable that the fin structure be formed in parallel with the air flow direction, namely, formed long in an arc direction. A strong flow of air generated when the blower wheel is rotated along radiation fins formed in a streamline form in parallel with the air flow direction can maximize heat radiation efficiency while passing between the heat radiation fins.

Now, the optimized installation position of the blower control unit will be described.

Figure 18:
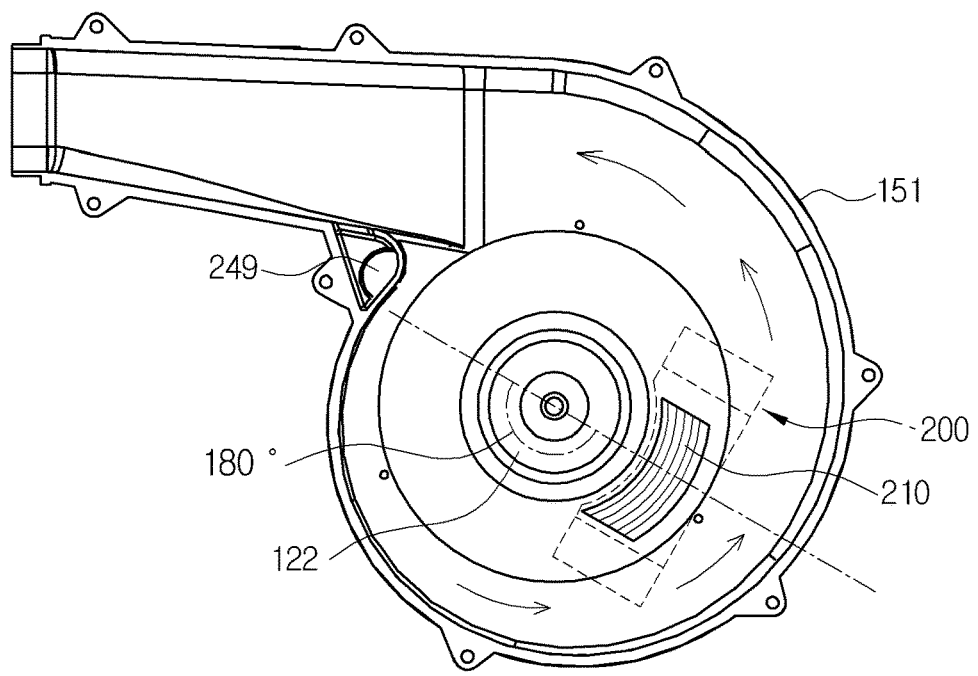
FIGS. 18 and 19 are views for explaining the optimum position of a blower control unit according to the third preferred embodiment of the present invention.
Figure 19:
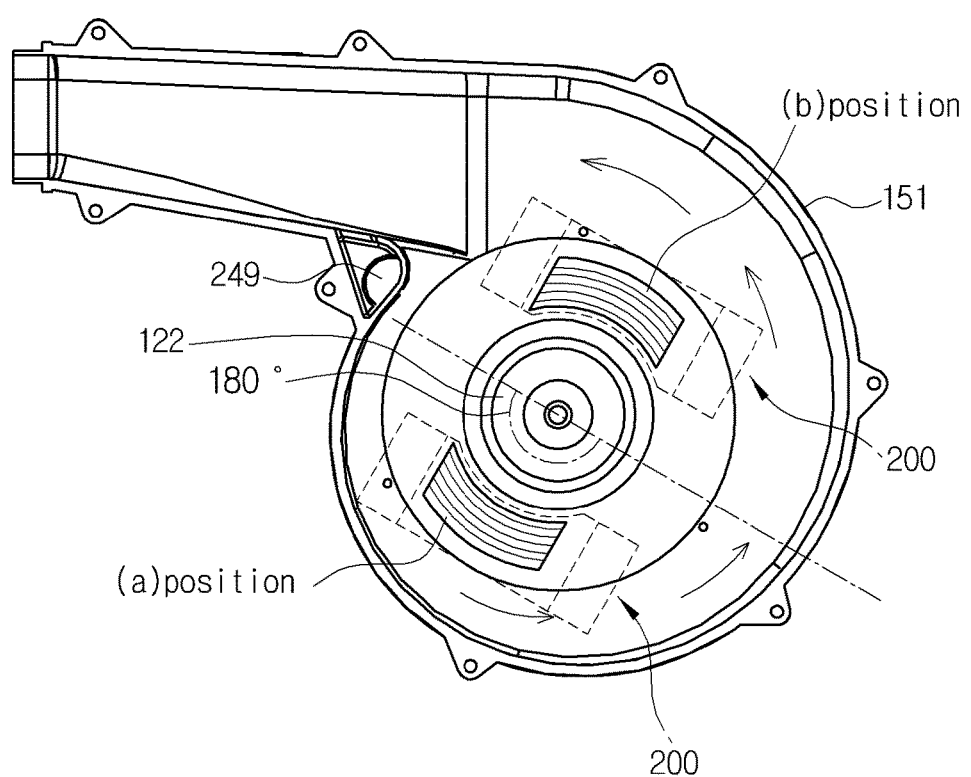

FIGS. 18 and 19 are views for explaining the optimum position of a blower control unit according to the third preferred embodiment of the present invention.

Referring to FIGS. 18 and 19, the blower control unit 200 is arranged at the opposite side region of the air-conditioning case based on the rear of the blower motor 122 relative to the antero-posterior direction of the vehicle and based on the blower motor 122 relative to the transverse direction of the vehicle. The air conditioner for the vehicle according to the third preferred embodiment of the present invention adopts a left hand drive type (LHD) that the driver's seat is located at the left of the vehicle and the passenger seat is located at the right of the vehicle. Hereinafter, all directions will be described based on the LHD type vehicle.

The air conditioner is located inside a cockpit module, and the air-blowing unit 150 in which the blower motor 122 is mounted is located at an area where a passenger's feet are located. The driver's seat cannot secure a space because steering wheels, a brake, various accelerators and others are located at the driver's seat side. Therefore, in order to secure the feet space of the passenger seat, the length of the protrusion 205 which downwardly protrudes must be minimized.

The blower control unit 200 is arranged in a region close to the outside of the vehicle in the right and left width direction of the vehicle, and is also arranged in a region close to the passenger in the antero-posterior direction of the vehicle.

The opposite side region of the air-conditioning case based on the rear of the blower motor 122 relative to the antero-posterior direction of the vehicle and based on the blower motor 122 relative to the transverse direction of the vehicle is an approximately rear and right area based on the blower motor 122. The blower control unit 200 arranged in such an area is located diagonally relative to the blower motor 122.

Finally, a lower part of the air-blowing unit is unavoidably increased in volume when the blower control unit is integrated with the blower motor, but in this instance, if the blower control unit 200 is arranged in the diagonal region to avoid the feet space of the passenger seat and to minimize the length protruding toward the passenger seat (at the rear side of the vehicle).

The blower control unit 200 includes a connector 270 connected to the wiring. The connector 270 is a terminal to electrically connect the wiring by inserting the wiring. The connector 270 is formed in the diagonal direction relative to the antero-posterior direction and in the right and left direction of the vehicle. The central portion of the blower control unit 200 is arranged at the right side and the rear relative to the rotary shaft of the blower motor to form a diagonal line. The connector 270 is formed in parallel with the diagonal direction. The wiring is inserted into the connector 270 in the diagonal direction. Therefore, because the wiring is easily inserted into the connector 270, it enhances work efficiency during assembly and maintenance.

In the meantime, while the blower motor 122 is rotated and operated, heat is generated by friction between a commutator and a brush. The air-blowing unit 150 includes a cooling hole 249 which receives some of the blown air to circulate the blower motor 122. The cooling hole 249 is to cool the blower motor 122.

A flow of the air generated from the blower wheel 121 goes into the blower motor 122 along a flow channel formed inside the blower cover 350 through the cooling hole 249 by a pressure difference, and then, circulates the inside of the air-blowing unit 150 through a discharge hole 260. During the circulation process, the blower motor 122 exchanges heat with the blown air to emit heat.

The blower control unit 200 is arranged to be opposed to the cooling hole 249 based on the rotary shaft of the blower motor. The cooling hole 249 is arranged at the front of the blower motor 122 relative to the antero-posterior direction of the vehicle and in the area facing the air-conditioning case based on the blower motor 122 relative to the right and left direction of the vehicle. In more detail, the blower control unit 200 and the cooling hole 249 are arranged at 180 degrees based on the rotary shaft of the blower motor.

In case of the LHD type vehicle, the blower motor 122 is located at the right of the air-conditioning unit 110, and the rotational direction of the blower motor 122 is the counterclockwise direction. The arrow of FIG. 18 indicates a flow direction of air. The cooling hole 249 is located at about 10 o'clock based on the rotary shaft of the blower motor.

The cooling hole 249 is arranged at the front of the blower motor 122 relative to the antero-posterior direction of the vehicle and on the side opposed to the air-conditioning case based on the blower motor 122 relative to the right and left direction of the vehicle, so that an air amount flown into the cooling hole 249 is maximized and the size of the air conditioner is not increased. If the cooling hole is arranged at another location, the air amount flown into the cooling hole may be decreased and the size of the air conditioner may be increased.

FIG. 19 illustrates a state that the blower control unit is arranged at an improper position which does not show a phase difference of 180 degrees relative to the cooling hole. Referring to FIG. 19, if the blower control unit 200 is within an angle range lower than 180 degrees in the air flow direction based on the rotary shaft of the blower motor, namely, is at a position (a), the heat sink 210 is deteriorated in cooling efficiency for want of air volume generated from a scroll of the air-blowing unit. Moreover, because the connector 270 faces the passenger seat, the feet space of the passenger seat is reduced.

Furthermore, if the blower control unit 200 is within an angle range greater than 180 degrees in the air flow direction based on the rotary shaft of the blower motor, namely, is at a position (b), the connector 270 faces the outer wall side (right door side) in the interior of the vehicle so that the wiring cannot be joined to the connector.

Because the blower control unit 200 and the cooling hole 249 are arranged at 180 degrees based on the rotary shaft of the blower motor, a sufficient air volume to cool the heat sink 210 can be secured, a space loss in the feet space of the passenger seat is minimized, and the writing can be easily inserted into the connector.

As described above, while the present invention has been particularly shown and described with reference to the example embodiment thereof, it will be understood by those of ordinary skill in the art that the above embodiment of the present invention is exemplified and various changes, modifications and equivalents may be made therein without changing the essential characteristics and scope of the present invention. Therefore, it would be understood that the protective scope of the present invention is defined by the technical idea of the following claims.

What is claimed is:

1. An air conditioner for a vehicle, including:
    a blower unit having a blower motor and a blower wheel extending about and along an axis, wherein the blower motor rotates the blower wheel at a rotational speed about the axis to blow air to the inside of an air-conditioning case;
    the blower motor extending axially between a first end and a second end, wherein the blower wheel is coupled with the second end of the blower motor;
    the blower unit further including a blower control unit controlling voltage applied to the blower motor to control the rotational speed of the blower wheel;
    a flange having a first surface and a second surface opposite the first surface;
    a seating wall extending axially from the first surface of the flange and defining a motor insertion hole receiving the blower motor such that the first end of the motor is on an axially opposite side of the flange as the second surface of the flange;
    the blower control unit including a printed circuit board fixed to the first surface of the flange;
    a blower cover overlying the first end of the motor and the printed circuit board and fixed to the first surface of the flange in the axial direction;
    a blower wheel connected to the rotary shaft of the blower motor on an opposite side of the flange as the blower motor; and
    a heat sink fixed to the second surface of the flange adjacent to the blower wheel in axial alignment with the printed circuit board and exposed on an opposite side of the flange as the blower motor and printed circuit board, wherein the blower unit defines a cooling hole configured to receive air to cool the blower motor, wherein a radius of the rotary shaft is also a central axis of the blower control unit and defines one of two sides of a 180 degree angle, and wherein a center of the cooling hole is positioned on the other of said two sides of the 180 degree angle.

2. The air conditioner according to claim 1, wherein a first terminal extends from the blower motor,
wherein a second terminal extends from the printed circuit board in alignment with the first terminal such that the first and second terminals are in engagement with one another and electrically connected when the blower motor is received by the motor insertion hole of the flange.

3. The air conditioner according to claim 1, wherein the first terminal extends axially from a lateral portion of the blower motor, and
wherein the second terminal extends axially toward the first terminal from the printed circuit board such that the first terminal may be inserted into the second terminal.

4. The air conditioner according to claim 2, wherein an end of the first terminal axially presses the second terminal toward the printed circuit board when the first terminal is inserted into the second terminal.

5. The air conditioner according to claim 1, wherein the flange comprises:
an extension jaw extending radially outwardly from the blower motor, and wherein the first terminal is disposed on the extension jaw; and
wherein the seating wall defines a fitting recess extending axially therein and in radial alignment with the extension jaw, and wherein the fitting recess receives the extension jaw for inhibiting circumferential movement of the blower motor relative to the seating wall.

6. The air conditioner according to claim 2, wherein the second terminal is positioned in axial alignment with the heat sink.

7. A vehicle, including:
a cabin extending between a first side and a second side in a width direction, and extending between an anterior side toward a front of the vehicle and a posterior side toward a back of the vehicle in a length direction;
a blower unit having a blower motor, wherein the blower motor rotates a blower wheel at a rotational speed about an axis to blow air to the inside of an air-conditioning case, and a blower control unit controlling voltage applied to the blower motor to control the rotational speed of the blower;
the blower motor extending axially between a first end and a second end, wherein the blower wheel is coupled with the second end of the blower motor;
a flange having a first surface and a second surface opposite the first surface;
a seating wall extending axially from the first surface of the flange and defining a motor insertion hole receiving the blower motor such that the first end of the motor is on an axially opposite side of the flange as the second surface of the flange;
the blower control unit fixed to the seating wall;
a blower cover overlying the first end of the motor and fixed to the first surface of the flange in the axial direction;
the blower wheel connected to the rotary shaft of the blower motor on an opposite side of the flange as the blower motor; and
wherein the blower control unit is arranged in a region close to one of the first and side sides in the width direction of the cabin and also arranged in a region close to the anterior side of the cabin in the length direction, and wherein the blower control unit is oriented diagonally relative to the blower motor, wherein the diagonal extends between corners of a rectangle having one of a first side and a second side in the width direction and another of the first and second sides along the length direction.

8. The air conditioner according to claim 7, wherein the blower control unit includes a printed circuit board having a first surface on which a plurality of components are mounted and a control unit cover for covering the printed circuit board, and
wherein the control unit cover comprises a flat portion and a protrusion for overlying relatively larger components.

9. The air conditioner according to claim 8, wherein the protrusion is arranged outwardly in the width direction of the cabin.

10. The air conditioner according to claim 8, wherein a heat sink is disposed on a second surface of the printed circuit board opposite the first surface of the circuit board for radiating heat away from the printed circuit board.

11. The air conditioner according to claim 10, wherein at least one of the components is arranged in axial alignment with the heat sink.

12. The air conditioner according to claim 8, wherein the printed circuit board is adjacent to the blower motor to be and partly overlapped by the blower motor and is joined to the flange, wherein the printed circuit board has a concave part formed at an edge of a middle part of the printed circuit board in a width direction of the printed circuit board, and wherein the concave part of the printed circuit board corresponds with a shape of the blower motor.

13. The air conditioner according to claim 8, wherein at least one of the plurality of the components is arranged at an edge part of the printed circuit board.

14. The air conditioner according to claim 8, wherein the blower control unit further includes a connector, and the connector is arranged adjacent to the protrusion of the control unit cover.

15. An air conditioner for a vehicle, including:
a blower unit having a blower motor and a blower wheel extending about and along an axis, wherein the blower motor rotates the blower wheel at a rotational speed about the axis to blow air to the inside of an air-conditioning case; and a blower control unit controlling voltage applied to the blower motor to control a rotational speed of the blower;
the blower motor extending axially between a first end and a second end, wherein the blower wheel is coupled with the second end of the blower motor;
a flange having a first surface and a second surface opposite the first surface;
a seating wall extending axially from the first surface of the flange and defining a motor insertion hole receiving the blower motor such that the first end of the motor is on an opposite side of the flange as the second surface of the flange;
a blower cover overlying the first end of the motor and the blower control unit and fixed to the first surface of the flange in the axial direction;

the blower wheel connected to the rotary shaft of the blower motor on an opposite side of the flange as the blower motor; and wherein a radius of the rotary shaft is also a central axis of the blower control unit and defines one of two sides of a 180 degree angle, and wherein a center of the cooling hole is positioned on the other of said two sides of the 180 degree angle.

16. The air conditioner according to claim 15, wherein the blower control unit comprises a heat sink for dissipating heat, and wherein the heat sink is arranged to be exposed in the same direction as the blower wheel in the lengthwise direction of a rotary shaft of the blower motor and on an opposite side of the flange as the motor.

17. The air conditioner according to claim 16, wherein at least a part of the heat sink is located in radial alignment with the blower wheel.

18. The air conditioner according to claim 15 wherein the blower cover defines a flow channel that is fluidly connected to the cooling hole for directing air generated from the blower wheel to the blower motor for cooling the blower motor.

* * * * *